United States Patent
Vijayan et al.

(10) Patent No.: US 6,678,257 B1
(45) Date of Patent: Jan. 13, 2004

(54) METHODS AND APPARATUS FOR ALLOCATION OF POWER TO BASE STATION CHANNELS

(75) Inventors: Rajiv Vijayan, San Diego, CA (US); Peter J. Black, San Diego, CA (US); Eduardo A. S. Esteves, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 138 days.

(21) Appl. No.: 09/669,950

(22) Filed: Sep. 25, 2000

(51) Int. Cl.[7] ............................................. H04B 7/216
(52) U.S. Cl. ...................................... 370/320; 455/522
(58) Field of Search ........................ 370/320, 331–342, 370/468, 318, 200–205, 254, 311, 347; 455/13.4, 437, 522, 450, 115.1, 69; 126/450–455; 134/522; 509/422–435, 440; 375/130–145, 146, 227, 222, 225; 437/562; 451/561, 517, 63–69; 714/710; 700/95

(56) References Cited

U.S. PATENT DOCUMENTS

| | | | | |
|---|---|---|---|---|
| 6,097,703 A | * | 8/2000 | Larsen et al. | 370/254 |
| 6,205,129 B1 | * | 3/2001 | Esteves et al. | 370/331 |
| 6,212,360 B1 | * | 4/2001 | Fleming, III et al. | 455/13.4 |
| 6,330,233 B1 | * | 12/2001 | Miya et al. | 370/342 |
| 6,330,460 B1 | * | 12/2001 | Wong et al. | 455/562 |
| 6,377,814 B1 | * | 4/2002 | Bender | 455/522 |
| 6,393,012 B1 | * | 5/2002 | Pankaj | 370/468 |
| 6,396,868 B1 | * | 5/2002 | Yoon et al. | 375/146 |
| 6,426,971 B1 | * | 7/2002 | Wu et al. | 375/227 |

FOREIGN PATENT DOCUMENTS

| | | |
|---|---|---|
| WO | 00/31893 | 6/2000 |
| WO | 00/54430 | 9/2000 |

OTHER PUBLICATIONS

Ayyagari, D.; Ephremides, A., Power Control based admission algorithms for maximizing throughput DS–CDMA networks with multimedia traffic, Mar. 1999, IEEE Wireless Communications and Networking Conference, vol. 2, p. 631–635.*

Jacobsmeyer, J.M., Congestion Relief on Power–controlled CDMA Networks, Dec. 1996, IEEE Journal, vol. 14, issue 9, p. 1758–1761.*

* cited by examiner

*Primary Examiner*—Chi Pham
*Assistant Examiner*—Prenell Jones
(74) *Attorney, Agent, or Firm*—Philip Wadsworth; Kent D. Baker; Albert J. Harnois (57) ABSTRACT

A method and apparatus that determines how much power to allocate to each of a plurality of reverse link power control (RLPC) Channels to be transmitted from a base station, based upon data rate control (DRC) messages transmitted to the base station. The DRC messages transmitted to the base station are used to determine the quality of the Forward Link over which the RLPC is to be transmitted. Even though the remote station to which the RLPC Channel is to be directed has not transmitted a DRC, the base station is capable of allocating power to the RLPC Channel based upon information provided to the base station in DRCs that were received by the base station. Accordingly, the base station can allocate power among the RLPC Channels without having received explicit information as to the quality of the Forward Link between the base station and every remote station intended to receive the information on the RLPC Channels.

24 Claims, 7 Drawing Sheets

METHODS AND APPARATUS FOR ALLOCATION OF POWER TO BASE STATION CHANNELS

BACKGROUND

I. Field

The present invention relates generally to mobile radio telephone systems. More specifically, the present invention relates to systems and methods for controlling the allocation and amount of power that will be transmitted on different channels from a Base Station to a Remote Station in a communication system.

II. Background

It has recently become more common to use spread spectrum techniques, such as code division multiple access (CDMA) techniques, to communicate information over wireless communication systems. For example, CDMA techniques are in wide use for communications between stationary Base Stations and mobile cellular telephones in a cellular telephone network. In accordance with CDMA techniques, several streams of information, typically from different sources, are each encoded (or "Channelized") using a different code. These codes allow the information to be transmitted over the same frequency band (commonly referred to as a "CDMA channel"). Each such Channelized information stream is commonly referred to as a "Code Channel".

It is presently well known that in order to minimize the amount of interference between Code Channels of a CDMA channel, the amount of power that is transmitted on each of the Code Channels must be carefully controlled. Furthermore, it is common for a single amplifier to be responsible for transmitting the entire CDMA channel. When a single amplifier is used to transmit an entire CDMA channel, the more power transmitted in one Code Channel, the less power is available to the other Code Channels. This is because there is typically a limit on the amount of total output power that such an amplifier can provide without undesirably distorting the amplified signals. For at least these reasons, it is important to properly allocate transmit power to each Code Channel in the same CDMA channel.

SUMMARY OF THE INVENTION

The described embodiments are directed to a system and method for allocating power to reverse link power control channels. In one aspect, a method for determining the amount of power that is required to transmit power control information from a first station to a plurality of stations is described. The method includes receiving data rate control information from the plurality of stations, the data rate control information indicating the data rate at which power control information is to be transmitted by the first station to the plurality of stations. The data rate control information from each station of the plurality of stations is then adjusted based upon a destination sector that the data rate control information is directed. The amount of power required to transmit the power control information to the plurality of stations is determined from the adjusted data rate control information.

In another aspect, a base station that allocates power to reverse link power control channels is described. The base station includes a receiver configured to receive data rate control information from a plurality of stations, the data rate control information indicating the data rate for which power control information is to be transmitted by the base station to the plurality of stations. The base station also includes a processor, coupled to the receiver, configured to adjust the data rate control information from each station of the plurality of stations based upon a destination sector that the data rate control information is directed and configured to determine from the adjusted data rate control information the amount of power required to transmit the power control information to the plurality of stations.

BRIEF DESCRIPTION OF THE DRAWINGS

The features, objects and advantages of the present invention will become more apparent from the detailed description set forth below when taken in conjunction with the drawings in which like reference characters identify like elements.

DETAILED DESCRIPTION

In one system used primarily for transmitting information at high data rates over a wireless communication link, at any given time all of the Code Channels in one direction are used to provide parallel data paths for information from a first end point to a second end point of the communication link. For example, information transmitted from a Base Station to one particular Remote Station is transmitted over all of the Code Channels. The transmission path in this direction is commonly referred to as either the "Forward Link" or "Down Link". In such a high data rate system, each Code Channel on the Forward Link is allocated approximately the same amount of power for transmission from the Base Station. Furthermore, transmissions to different Remote Stations are time multiplexed. That is, during a first time slot, all of the Code Channels of the CDMA Channel are allocated to transmitting information to a first Remote Station. During a second time slot, all of the Code Channels of the CDMA Channel are allocated to transmitting information to a second Remote Station. Additional time slots provide communication links between the Base Station and other Remote Stations.

In one embodiment, the first end point of the communication link is a Base Station and the second end point of the communication link is a Remote Station. In another embodiment, the first end point of the communication link is Remote Station and the second end point of the communication link is a Base Station. A Base Station is also known as an Access Point. A Remote Station is also known as an Access Terminal.

The data path by which information is transmitted from a particular Remote Station to the Base Station is commonly referred to either as the "Reverse Link" or the "Up Link". In one high data rate system, the Code Channels of a Reverse Link are each allocated to different Remote Stations. The amount of power that is used to transmit the information on the Reverse Link must be controlled to reduce interference at the receiving Base Station between Code Channels of the same CDMA channel.

Accordingly, portions of each Code Channel on the Forward Link are reserved for transmitting power control information. The reserved portions of a particular Code Channel within one slot form a "Reverse Link Power Control (RLPC) Channel". Each such RLPC Channel on the Forward Link is associated with one Remote Station. The power control information that is transmitted on a particular RLPC Channel is intended to be received and used by one particular Remote Station to control the reverse link power transmitted by that particular Remote Station. The power control information assists in maintaining the output power from each Remote Station at a minimum level required for information to be reliably received from each Remote Station on the Reverse Link.

Figure 1:
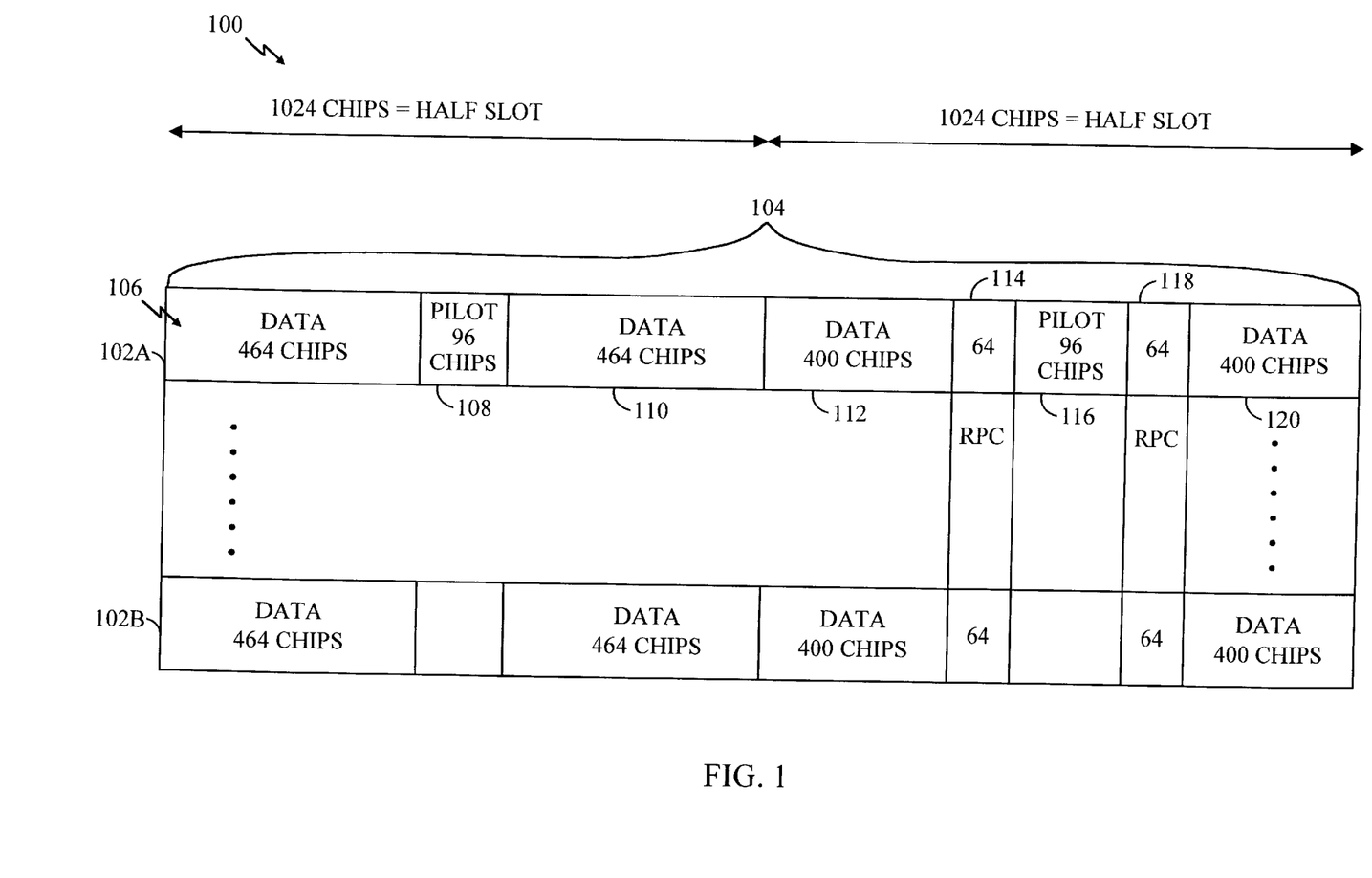
FIG. 1 is an illustration of the format of a Forward Link of one particular communication system.

FIG. 1 is an illustration of the format of a Forward Link structure of one particular communication system. In the link shown in FIG. 1, a portion of each Code Channel forms a RLPC Channel over which reverse power control information is transmitted.

FIG. 1 shows a Forward Link 100 formatted in Code Channels 102. Two Code Channels 102a and 102b are explicitly shown in FIG. 1. However, in accordance with the embodiment shown in FIG. 1, 32 Code Channels are provided on the Forward Link CDMA channel. Each Code Channel is divided into "Slots" 104. In a typical system, such as the one shown in FIG. 1, each Slot 104 in the Forward Link has a predetermined duration. Each Slot is assigned to a particular Remote Station. In the embodiment shown in FIG. 1, each Slot comprises 2048 "Chips". A Chip is defined as a duration in time that is equal to the duration of one bit of the code used to channelize the Code Channels. Each Slot 104 begins with a first data field 106 that is 464 Chips in length. A pilot field 108 follows the first data field 106. The pilot field is 96 chips in length. The pilot field 108, among other uses, allows the receiving device to synchronize to the phase of the incoming Forward Link signals (which include the pilot field 108 itself). A second data field 110 having a length of 464 Chips is then transmitted. A third data field 112 having a length of 400 Chips is transmitted next. Following the third data field 112, a power control field 114 is transmitted. The first power control field 114 has a length of 64 Chips. Next, a second pilot field 116 having a length of 96 Chips is transmitted, followed by a second power control field 118 having a length of 64 Chips. The last field in the Slot 104 is a fourth data field 120 having a length of 400 Chips.

The power control fields 114, 118 within one Code Channel 102 form one RLPC Channel. Accordingly, the RLPC Channel is "Embedded" in the Data. Under most conditions, a determination can be made at the Base Station so that more, less, or the same amount of power is transmitted over the Reverse Link from a Remote Station. The determination is made based on the strength of the signal received by the Base Station from a particular Remote Station.

Typically, when transmitting the Forward Link, the same amount of power is used to transmit each Code Channel in the CDMA channel. It is appropriate to transmit the Code Channels at the same power, since the Data is essentially directed to one Remote Station. For the purposes of this description, "Data" is defined as information that is provided by the communication system user, and does not include information that is transmitted between components of the system in order to manage and/or support system operations (such as overhead messages). However, since each RLPC Channel is directed to a different Remote Station, transmitting each RLPC Channel of the CDMA channel at the same power level means that some of the RLPC Channels will be transmitted at power levels that are either greater than or less than is required. This is because the amount of power that is required to transmit to a Remote Station that is closer is less than the amount of power required to transmit to a Remote Station that is farther away. Accordingly, it can be seen that transmitting all RLPC Channels at the same power level is undesirable for the following reason. There is an absolute maximum total amount of power that can be transmitted by all of the RLPC Channels taken together. Therefore, using more power than is required for some RLPC Channels means that other RLPC Channels will get less power than might otherwise be possible if the power were allocated based on the actual requirements of each RLPC Channel rather than being allocated equally to all RLPC Channels. This could be problematic if the farthest Remote Station requires more power than 1/N, where N is the total number of RLPC Channels. It should be noted that the amount of power "required" to "reliably" transmit information, as referred to herein, is the amount of power that is needed to ensure that the information can be decoded with a predetermined error rate. The particular error rate depends upon the particular application of the disclosed method and apparatus.

Figure 2:
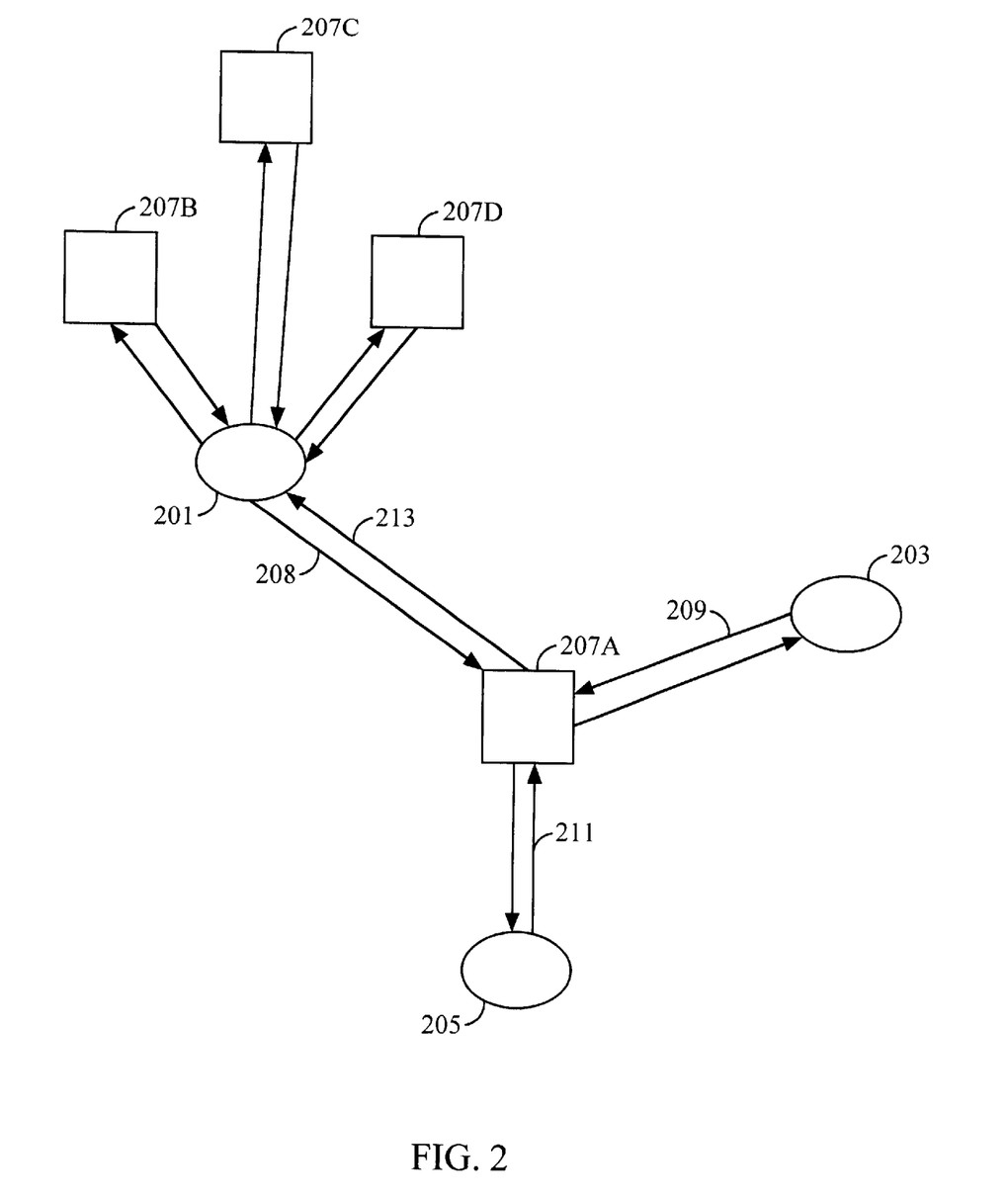
FIG. 2 shows a communication system that includes seven Base Stations.

However, determining the amount of power that is required by each RLPC Channel is difficult for some Base Stations from which transmission of RLPC information would be desirable. This can be understood from the following example. FIG. 2 is an illustration of a system including three Base Stations 201, 203, 205 and four Remote Stations 207. Assume for simplicity, each Base Station 201, 203, or 205 has only one sector. Each Remote Station 207 typically maintains a list (commonly referred to as the "Active Set") of Base Station sectors 201, 203, 205 from which the Forward Link 208 to that Remote Station 207 may originate. However, the Forward Link 208 will only originate from one of the Base Station sectors 201, 203, 205 in the Active Set at any one time. The transmission paths 209, 211 between those Base Station sectors 203, 205 that are not transmitting the Forward Link 208 to the Remote Station 207a typically has different loss characteristics than the transmission path 213 between the Base Station sector 201 that is transmitting the Forward Link 208 and the Remote Station 207a. Since nothing is being transmitted to the Remote Station 207a from the other Base Station sectors 203, 205 in the Active Set, it is not possible to characterize the loss over the Forward Links 209, 211 between the other Base Station sectors 203, 205 and the Remote Station 207a. Nonetheless, the Remote Station 207a will be transmitting to the other Base Station sectors 203, 205. Therefore, it is desirable to have each Base Station sector 201, 203, 205 in the Active Set send reverse link power control information to the Remote Station 207a so that the Remote Station 207a will have information regarding the amount of power to send if selected to transmit.

A system and method for allocating power to RLPC Channels is described in U.S. patent application Ser. No. 09/267,565 entitled "Methods and Apparatus for Power Allocation on a Reverse Link of a Communication System", filed Mar. 12, 1999, which is assigned to the assignee of the present invention and fully incorporated herein by reference. The system and method uses historical information to determine the power levels of the RLPC Channels. Thus, historical information is required. However, historical information may not be available. Therefore, it is desirable to allocate power to the RLPC Channels without needing historical information to determine the power levels of the RLPC Channels.

Determining the amount of power that is required by each RLPC Channel is difficult for a Base Station having many Remote Stations, wherein the power required by all of the RLPC Channels taken together exceed maximum total transmit power for a Base Station sector. Therefore, it is desirable to allocate the total transmit power for a Base Station sector among the Remote Stations with the Base Station sector in their active list.

Generally, as a Remote Station moves away from a Base Station, the RLPC Channel for that Remote Station requires more power to transmit information reliably from the Base Station to the Remote Station. Since there is an absolute maximum total amount of power that can be transmitted, power of another RLPC Channel must be reduced. Therefore, it is desirable to dynamically allocate a sector of a Base Station's total transmit power among RLPC Channels of the Remote Stations, which have the sector of the Base Station in their active list.

The disclosed method and apparatus determines how much power to allocate to each of a plurality of reverse link power control (RLPC) Channels to be transmitted from a Base Station, based upon the data rate control (DRC) messages transmitted to the Base Station. However, since Base Stations transmit RLPC Channels to Remote Stations that have not transmitted a DRC to the transmitting Base Station, DRC information from the transmitting Remote Station over which the RLPC is to be transmitted is used to determine the quality of the Forward Link over which the RLPC is to be transmitted.

Therefore, a need currently exists for a method and apparatus to determine the relative amount of power that should be used to transmit reverse link power control information from a sector of a Base Station that is in the Active Set of a Remote Station, but which is not transmitting a Forward Link signal to that Remote Station and has not transmitted a Forward Link signal.

For the purpose of this document, quality is directly proportional to the amount of power required to reliably transmit a predetermined amount of information in a predetermined amount of time with a predetermined error rate. Although the Remote Station to which the RLPC Channel is to be directed has not transmitted a DRC directed to that Base Station, the disclosed method and apparatus allows the RLPC Channel to be allocated its required power. The Base Station allocates power to the RLPC Channels based upon information provided to the Base Station in DRCs that were received by the Base Station, regardless of whether the DRCs were directed to other Base Stations. Accordingly, the Base Station can allocate power among the RLPC Channels without having received explicit information as to the quality of the Forward Link between the Base Station and every Remote Station intended to receive the information on the RLPC Channels.

The method and apparatus that is disclosed in this document allows a first station (such as a Base Station within a communication system) to determine how much power to allocate to each "Reverse Link Power Control (RLPC) Channel" that is being transmitted by the first station. For the purpose of this document, an RLPC Channel is defined as any portion of a communication path that is used to communicate information from a first station to a second station regarding the amount of power the receiving second station should transmit back to the first station. A "Forward Link" is defined as a communication link transmitted from a first station to a second station. A "Reverse Link" is defined as the communication link transmitted from the second station to the first station. A "Base Station" is defined as a fixed transmitting and receiving station for interfacing a wireless communications device to a wireline communications system or to another wireless communication device. A "Remote Station" is defined as a station that communicates with a Base Station over a wireless link.

FIG. 2 shows a communication system that includes seven stations 201, 203, 205, 207a, 207b, 207c, 207d. In accordance with one embodiment of the disclosed method and apparatus, the first, second and third stations 201, 203, 205 are Base Stations. The fourth, fifth, sixth, and seventh stations 207 are Remote Stations (such as a wireless local loop telephone, a hand held telephone, a modem, a computer terminal, or another device or system used to originate information to be transmitted over the communication system). It should be understood that the number of Remote Stations is typically much greater than the number of Base Stations. However, only four Remote Stations 207 are shown in FIG. 2 for the sake of simplicity. It should be understood that each station may be either a Remote Station or a Base Station, depending upon the type of communication system in which these stations are being used.

The disclosed method and apparatus is described essentially in the context of allocation of power among RLPC Channels. However, in systems in which the roles of the Forward and Reverse Links are reversed from that set forth in this description, the disclosed method and apparatus applies equally well to the allocation of power among "Forward Link Power Control Channels". Nonetheless, for ease and clarity, the disclosed method and apparatus is described in the context of allocation of power to RLPC Channels transmitted in the Forward Link.

In accordance with one embodiment of the disclosed method and apparatus, multiple Remote Stations concurrently transmit Data over the Reverse Link to one Base Station. This Data is transmitted from each Remote Station to a Base Station on a separate Code Channel. For example, the four Remote Stations 207 may each be transmitting information over the Reverse Link to the Base Station 201.

In the context of one system for allocating power among RLPC Channels, a Base Station transmits Data on a Forward Link to one Remote Station at a time. In addition, each Remote Station advantageously receives Data from only one Base Station at a time. For the purposes of this description, "Data" is defined as information that is provided by the communication system user, and does not include information that is transmitted between components of the system in order to manage and/or support system operations (such as overhead messages).

Each Remote Station maintains a "Set" (or list) of "Active" Base Station sectors (i.e., an "Active Set"). A sector of a Base Station is placed in the Active Set if that Base Station is transmitting a Forward Link that is being received by the Remote Station 207 with at least a predetermined level of quality. In one embodiment, the quality of the Forward Link is determined by the quality of portions 108, 116 of the Forward Link 100, referred to as the "Pilot Channel." In one embodiment, a Pilot Channel is made up of portions 108, 116 of the Forward Link that are used by a Remote Station to determine the quality of the Forward Link and to determine the relative phase of the information being received by a Remote Station. In accordance with the embodiment of the disclosed method and apparatus shown in FIGS. 1 and 2, the Pilot Channel is transmitted on only one Code Channel 102a from among the Code Channels 102 in the CDMA channel. Furthermore, the Pilot Channel is transmitted only during two fields 108, 116 of each Slot 104.

The quality of the Pilot Channel may be determined by measuring a ratio of signal-to-noise, frequently referred to as "Carrier/Interference" or "C/I". Such measurements of the quality of the Pilot Channel are well known to those skilled in the art. The quality of the Pilot Channel can be used to determine the quality of the entire Forward Link. It should be understood that the quality of the Forward Link may be determined by any other means known, such as by measuring the signal to noise ratio of a Forward Link "Traffic Channel" (i.e., that portion of the Forward Link that carries the Data). Alternatively, any other portion of the Forward Link may be used to determine the quality of the Forward Link. However, since the Pilot Channel is spread in a predetermined manner, the Pilot Channel provides an appropriate channel for determining the quality of the Forward Link. Nonetheless, signal-to-noise ratio is only one parameter that can be used by the Remote Station to determine the quality of the Forward Link. Any other method for determining the quality of the Forward Link can be used in accordance with the disclosed method and apparatus.

If the quality of the Forward Link received by a Remote Station is such that Data can be transmitted over the Forward Link at a predetermined data rate with a predetermined reliability, then the transmitting Base Station may be placed in the Remote Station's Active Set. However, in accordance with one embodiment of the disclosed method and apparatus, a Pilot Channel from a particular Base Station may be received by the Remote Station with sufficient quality and still not be added to the Active Set. This may be true if there are a predetermined number of Active Base Stations already in the Active Set and the Active Set can only support the predetermined number of Active Base Stations. In the embodiment of the disclosed method and apparatus in which C/I is used to determine the quality of the Forward Link, the Remote Station 207 calculates a data rate based upon the C/I of the pilot received from the selected Base Station. The data rate is calculated to result in Data being received at the Remote Station with a predetermined reliability. It will be understood by those skilled in the art that the reliability with which Data can be transmitted depends upon the quality of the Forward Link (i.e., the C/I) and the data rate.

Since the Remote Station 207A only receives data from one of the Base Stations in the Active Set at any one time, the Remote Station 207A selects one of the Base Stations in the Active Set to transmit data to the Remote Station 207A. The selected Base Station 201 is the Base Station 201 from which the Remote Station 207A receives the best quality Forward Link (i.e., the Base Station transmitting the Forward Link capable of supporting the highest data rate). In accordance with one embodiment of the disclosed method and apparatus, the rate at which the selected Base Station can reliably transmit Data to a particular Remote Station is communicated to the selected Base Station by the particular Remote Station 207 over the Reverse Link. The data rate is encoded with a unique code that indicates for which Base Station the data rate information is intended.

When the selected Base Station 201 receives the data rate information, the selected Base Station uses this information to determine the C/I of the pilot that was received by the transmitting Remote Station 207A. In accordance with one embodiment of the disclosed method and apparatus, the method used by the selected Base Station 201 to calculate the C/I of the Forward Link transmitted from the data rate is the inverse of the method used by the Remote Station 207A to calculate the data rate from the measured C/I of the Forward Link pilot signal.

The selected Base Station 201 determines the amount of power to allocate to a particular RLPC Channel based upon the quality of the Forward Link as determined by the Remote Station 207A. In accordance with the embodiment shown in FIGS. 1 and 2, the Forward Link can support as many RLPC Channels as there are Code Channels 102. Each such RLPC Channel is intended for a different Remote Station 207. The number of RLPC Channels to be transmitted by a Base Station 201 is equal to the number of Remote Stations that include that Base Station 201 in their Active Set. For example, if only three Remote Stations 207a, 207b, 207c have a particular Base Station 201 in their Active Set, then the Base Station 201 transmits a Forward Link 208 that includes three RLPC Channels, one RLPC Channel intended for each of the three Remote Stations 207a, 207b, 207c that include that Base Station 201 in the Active Set.

The Base Station 201 also receives information over the Reverse Link from each of these three Remote Stations 207a, 207b, 207c. Accordingly, the receiving Base Station 201 must provide power control information to each of the three Remote Stations 207a, 207b, 207c. This information is provided in a power control message over the RLPC Channels. Each such RLPC Channel is transmitted over one Code Channel during the two power control fields 114, 118 of each Slot. No power is allocated to the unused RLPC Channels (i.e., to the other Code Channels during the power control fields 114, 118). Therefore, if the Forward Link uses a CDMA channel that includes thirty-two Code Channels, only three of the 32 Code Channels are required during the reverse link power control fields 114, 118 (assuming that the Base Station is included in the Active Sets of only three Remote Stations). Accordingly, no power would be transmitted on the other twenty-nine Code Channels of the Forward Link. This allows the maximum amount of power to be allocated to the three RLPC Channels that are directed to Remote Stations 207a, 207b, 207c that include the Base Station 201 in their Active Set. Each Remote Station 207a, 207b, 207c determines which particular power control message is intended for that Remote Station based upon the particular Code Channel 102 over which the message is sent (i.e., the particular Code Channel 102 that is used to support the RLPC Channel).

It can be seen that the allocation of power among the RLPC Channels requires that the Base Station identify each Remote Station that includes the Base Station in the Active Set. In addition, the Base Station must determine the quality of the RLPC Channel in order to determine the amount of power to allocate to each of the RLPC Channels. In accordance with the disclosed method and apparatus, the Remote Station transmits an overhead message over the Reverse Link that indicates when a new Base Station has been added to the Active Set. A Base Station that is added to the Active Set of a Remote Station will receive overhead messages, either directly from the Remote Station or through another Base Station which then communicates the information to the Base Station that has been added. Therefore, a Base Station can maintain a list of those Remote Stations that include that Base Station in their Active Set.

However, in one embodiment, each Remote Station transmits information regarding only the quality of one Forward Link. That is, a Remote Station only transmits information regarding the Forward Link between that Remote Station and the one Base Station that is currently selected by that Remote Station to transmit data to that Remote Station. For example, assume the Active Set of the Remote Station 207a includes the three Base Stations 201, 203, 205. Remote Station 207a transmits the data rate at which that Remote Station 207a can receive Data from the Base Station 201, assuming that the Forward Link between the Base Station 201 and the Remote Station 207a has a higher quality than the other two Forward Links 209, 211. This data rate information can be used to determine the quality of the Forward Link 208 (and so the quality of the RLPC Channel). However, while the Base Stations 203, 205 receive the data rate information transmitted from the Remote Station 207a, the data rate information is only relevant to the Forward Link 208 between the select Base Station 201 and the Remote Station 207a. Therefore, the other Base Stations 203, 205 in the Active Set have no information about the current quality of the Forward Links 209, 211 between them and the Remote Station 207a.

Rather than allocating power among the RLPC Channels either arbitrarily or equally, the disclosed method and apparatus uses DRC information from the transmitting Remote Station over which the RLPC is to be transmitted to determine the quality of the Forward Link over which the RLPC is to be transmitted to assist in determining the quality of each of the RLPC Channels to be transmitted.

Figure 3:
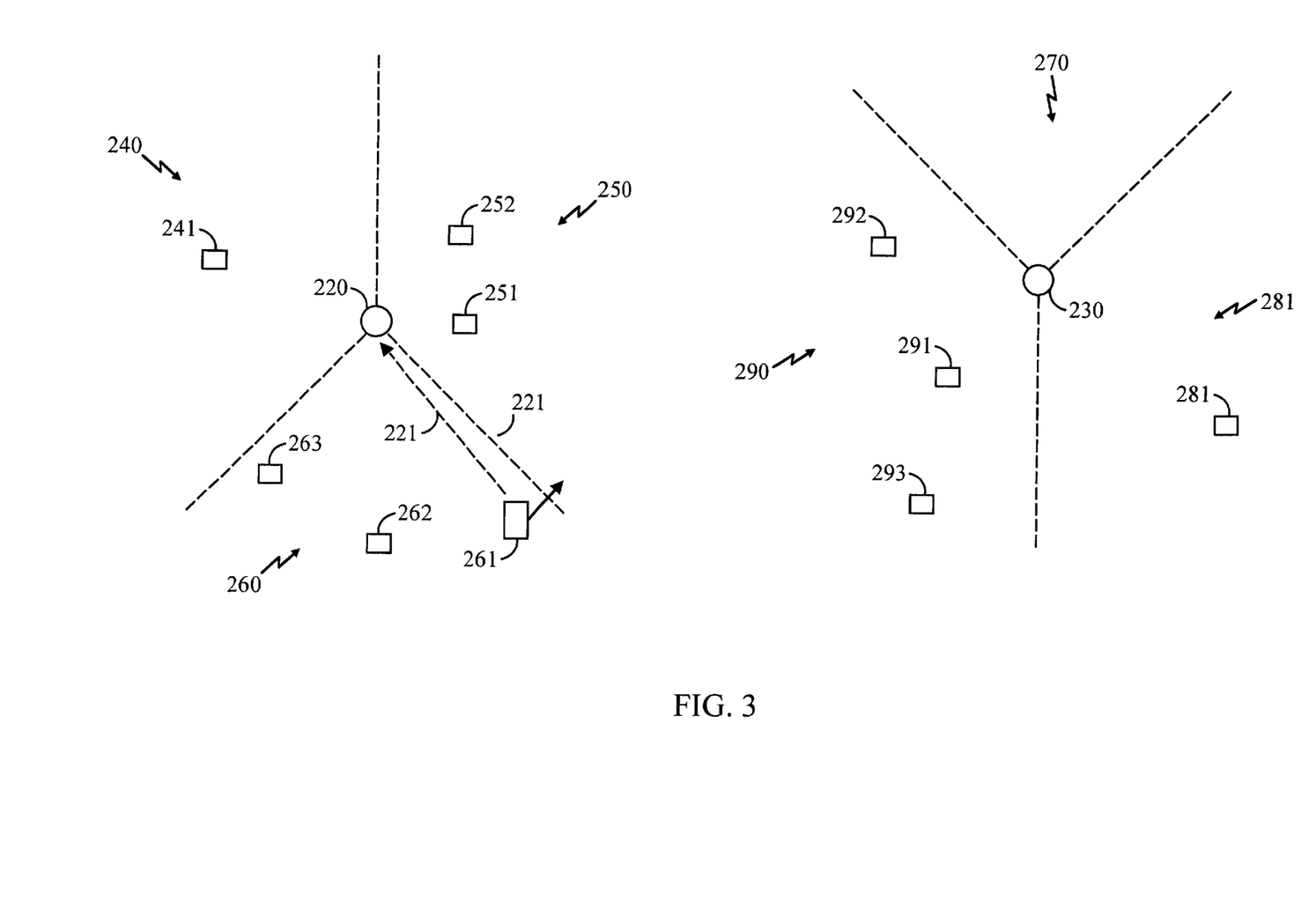
FIG. 3 is an illustration of a system including two Base Stations and ten Remote Stations.

FIG. 3 is an illustration of a system including two Base Stations 220, 230, and ten Remote Stations 241, 251, 252, 261, 262, 263, 281, 291, 292, 293. Base Station 220 has three sectors 240, 250, 260. Base Station 230 has three sectors 270, 280, 290. Sector one 240 of Base Station 220 has a coverage area including one Remote Station 241. Sector two 250 of Base Station 220 has a coverage area including two Remote Stations 251, 252. Sector three 260 of Base Station 220 has a coverage area including three Remote Stations 261, 262, 263. Sector one 270 of Base Station 230 has a coverage area that does not include a Remote Station. Sector two 280 has a coverage area including only one Remote Station 281. Sector three 290 has a coverage area including three Remote Stations 291, 292, 293. Remote Station 261 is moving from sector three 260 of Base Station 220 to sector two 250 of Base Station 220.

It is assumed that the Active Sets of the six Remote Stations 241, 251, 252, 261, 262, 263 include the sectors of Base Station 220 and it is assumed that the Active Sets of four Remote Stations 281, 291, 292, 293 include the Base Station 230. There is overlap between base station sectors. For example, sector two 250 of Base Station 220 and sector three 290 of base station 230 may overlap. Consequently, Remote Stations 251, 252 may have Base Station 230 in their active list and Remote Stations 291, 292, 293 may have Base Station 220 in their active list. Base Station 220 is receiving Data from at least six Remote Stations 241, 251, 252, 261, 262, 263. Base Station 230 is receiving Data from at least four Remote Stations 281, 291, 292, 293. The Base Station 220 receives "Data Rate Control" (DRC) messages over a Reverse Link 221 associated with the Remote Station 261. The Base Station 220 stores the received DRC messages in its memory.

As Remote Station 261 moves from one sector to another, the allocation of power to the RLPC Channel corresponding to all of the Remote Stations is dynamically changed taking into account the change in the power required by Remote Station 261. Each sector is not limited to three Remote Stations.

The Base Station 220 makes power control (PC) decisions for each Remote Station in its coverage area (STEP 301). Thus, the Base Station 220 determines whether the Remote Station 261 is transmitting the Reverse Link 221 with too much or too little power. In accordance with one embodiment, this determination is based upon a C/I measurement of the Reverse Link. In accordance with another embodiment, this determination is based on the error rate of the Reverse Link 221. Those skilled in the art will understand that there are many other ways in which the Base Station can determine whether the Remote Station has transmitted the information over the Reverse Link with an appropriate amount of power to be reliably received by the Base Station, but without using more power than is required. Accordingly, any known means may be used for making this determination in accordance with the disclosed method and apparatus.

Figure 4A:
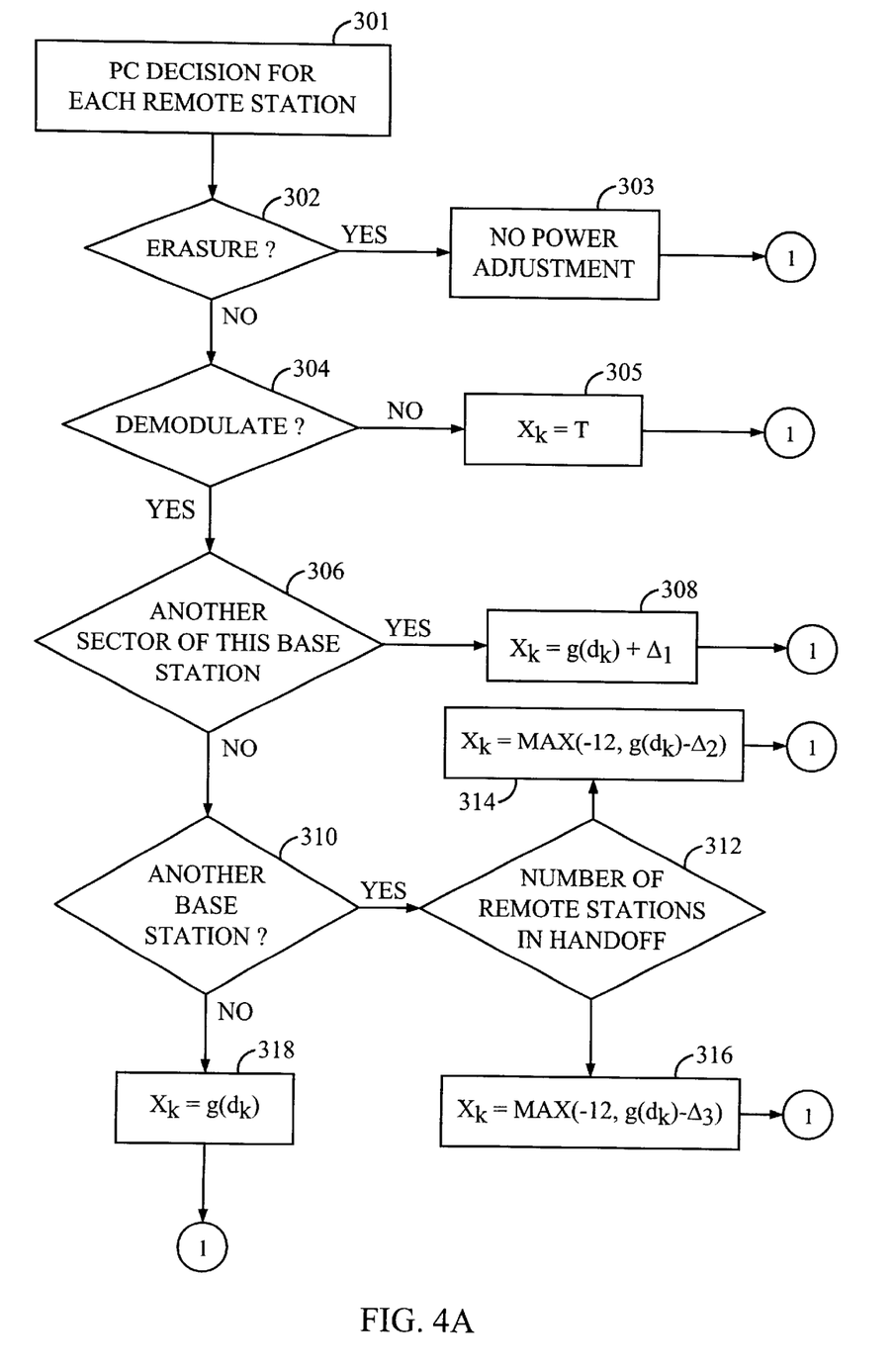
FIGS. 4a–4b are a flowchart illustrating method steps performed by a Base Station in accordance with one embodiment.
Figure 4B:
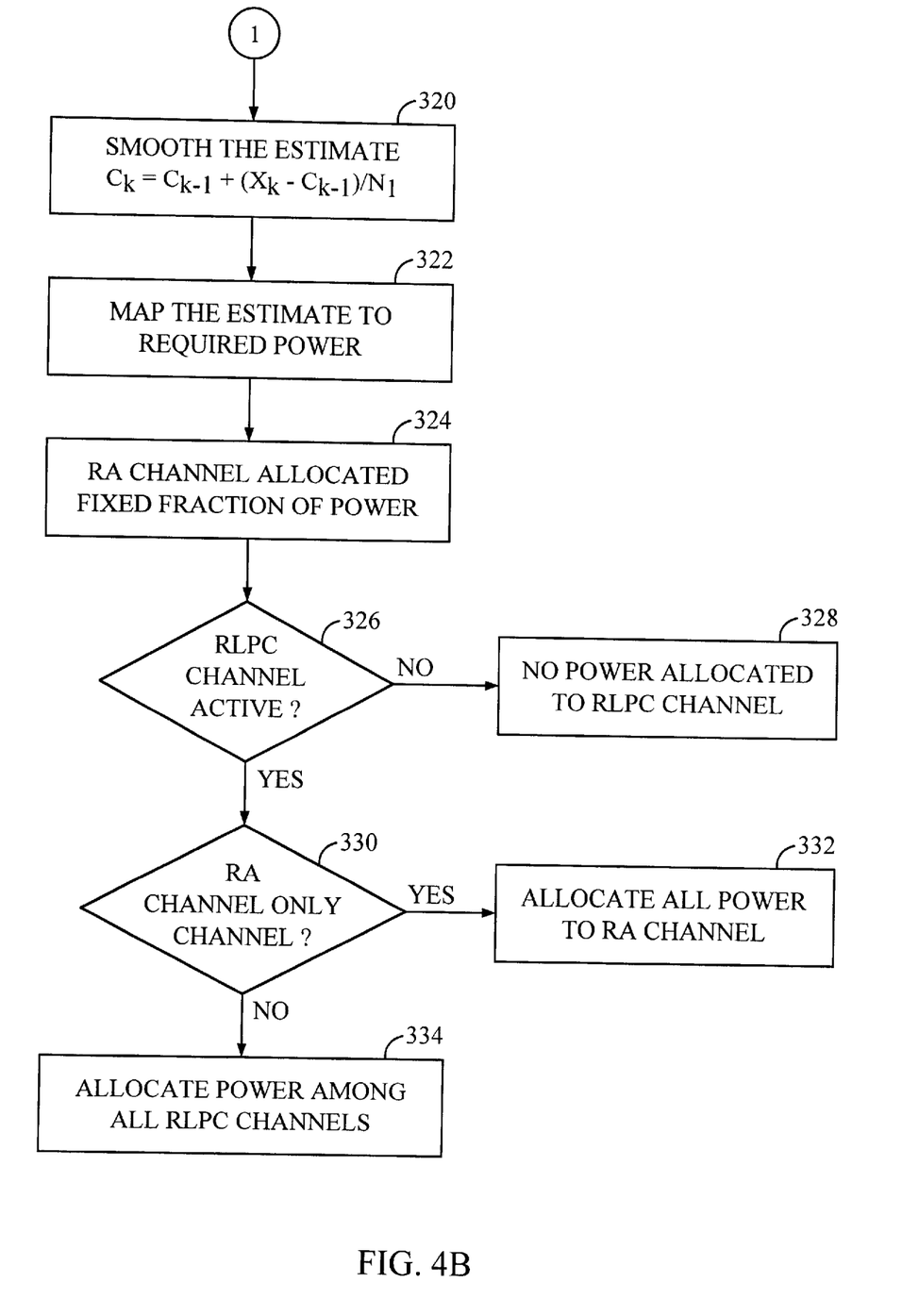

FIGS. 4a–4b is a flowchart of method steps performed in accordance with one disclosed method for determining the amount of power to allocate to each RLPC Channel. The method illustrated in FIGS. 4a–4b is performed independently by a Base Station for each sector in a communication system. The average forward link C/I is estimated, then the required power for the RLPC Channel for the Remote Station receiving the forward link data is calculated, and finally the power is allocated among the RLPC Channels. The steps of FIGS. 4a–4b are described below from the perspective of one sector of a Base Station.

If the power that is being sent on the Reverse Link 221 is appropriate, (STEP 302), then the power level allocated to the RLPC Channel associated with the Remote Station 261 from which the Reverse Link 221 originated (STEP 303) is not adjusted. This condition is referred to as an "Erasure." A check is made to determine if the Base Station can demodulate the DRC message (STEP 304). If the Base Station cannot demodulate the DRC message, then the amount of power is set to a constant. (STEP 305). This condition is also referred to as an "Erasure." If the Base Station determines that the Remote Station is transmitting with either too little or too much power, then a change in the amount of power is required on the Reverse Link (i.e., an erasure does not occur). In such a case, the Base Station 220 determines whether the Current DRC message is "Directed" to another sector for the Base Station 220 (STEP 306). The DRC message is Directed to a particular sector if the DRC message provides information about the rate at which the transmitting Remote Station can receive information from that sector. The information may be provided in any manner, such as a measure of the quality of the Forward Link, or the actual data rate that can be supported by the Forward link. It should be noted that in accordance with one embodiment of the disclosed method and apparatus, each Remote Station transmits DRC messages at a predetermined rate. Each DRC message indicates the Remote Station from which the DRC message came.

The power required for the RPC subchannel is not the same for all Remote Stations. Remote Stations close to the Base Station require less power than Remote Stations near the cell edge. If the available power is divided equally among all Remote Stations, then Remote Stations with low forward link C/I are likely to experience a high RPC bit error rate, thereby degrading reverse link power control. The forward link rate requested by the terminal on the DRC channel is an indicator of its C/I. The allocation algorithm uses the DRC information to allocate power among the different users in proportion to their needs.

A digital signal processor (DSP) of the Remote Station maintains an estimate of the forward link C/I in dB as seen by the Remote Station. This estimate is used to calculate how much power is required for the Remote Station's RPC subchannel. A higher C/I value indicates a lower requirement on the RPC subchannel power.

In one embodiment, mapping from a forward link rate to C/I in dB is implemented in software. In another embodiment, the mapping is implemented in hardware. In yet another embodiment, the mapping is implemented in a combination of software and hardware. In one embodiment, the mapping is maintained as a lookup table mapping each forward link rate to required C/I in dB. In another embodiment, the mapping is executed by a software algorithm.

Let $g(\bullet)$ denote the mapping from a DRC value to C/I in dB. The DRC value received in the kth slot, $d_k$, is mapped to a C/I estimate, $x_k$, as follows:

$$x_k = \begin{cases} g(d_k) & \text{if the } DRC \text{ is directed at this sector.} \\ g(d_k) + \Delta_1 & \text{if the } DRC \text{ is directed at another sector in this base station. Softer handoff.} \\ \max(-12, g(d_k) - \Delta_2) & \text{if the } DRC \text{ is directed at another base station and the remote station is in a 2-way soft handoff.} \\ \max(-12, g(d_k) - \Delta_3) & \text{if the } DRC \text{ is directed at another base station and the remote station is in a 3-way (or more) soft handoff.} \\ T & \text{if the } DRC \text{ is not demodulated.} \end{cases}$$

In one embodiment, power allocation is performed on a sector-by-sector basis. It would be apparent to those skilled in the art that the power allocation algorithm can be applied to any subdivision of a Base Station's coverage area. It would also be apparent to those skilled in the art that the Δs can be positive or negative.

When the DRC is directed at the sector executing the power allocation algorithm, the Base Station 220 does not adjust the quality determination (STEP 304). That is, there is no adjustment to the C/I estimate $x_k$.

When the DRC is directed at another sector of the current Base Station (BTS), it is reasonable to assume that most of the power required for the RPC channel will be supplied by that sector. Since all sectors from the same Base Station transmit the same RPC commands and the Remote Station combines the signals from these sectors to demodulate the DRC bit, the current sector just has to supply enough power so as not to degrade the transmission from the other sector. This is why the value of $x_k$ is increased in this case (STEP 308), i.e., the estimate of required power is lowered.

The quality of the Forward Link will determine the amount of power allocated to the RLPC Channel. Signals transmitted over lower quality links are transmitted with more power, while signals transmitted over higher quality links are transmitted with less power. Therefore, adjusting the quality value to indicate a higher quality link results in less power being allocated to the RLPC Channel associated with the Remote Station 261 from which no Current DRC message directed to that Base Station is available. This results in more power being available for the RLPC Channel associated with the Remote Station from which the Base Station has received a Current DRC message directed to that Base Station.

When the DRC is directed at another Base Station (STEP 310), the DRC provides an indication of the C/I on the forward link from that Base Station to the Remote Station. Since generally the Remote Station directs its DRC to the sector with the best forward link, it can be assumed that the forward link from the current sector has a C/I that is lower than that indicated by the DRC. To account for this, $x_k$ is lowered in this case, i.e. the estimate of required power is increased. That is, when the DRC is directed at another Base Station, the Base Station adjusts the quality value downward. Such an adjustment results in more power being allocated to the RLPC Channel associated with that Remote Station 261. This is appropriate if there is a desire to increase the possibility that the RLPC Channel will be reliably received by the Remote Station 261. As noted above, there is a limited amount of total power available to transmit all of the RLPC Channels. Therefore, increasing the amount of power with which a RLPC Channel is transmitted to one Remote Station decreases the amount of power that is available to transmit RLPC Channels to the other Remote Stations.

In one embodiment, the amount of the adjustment is the same whether there are two base stations involved in a handoff or whether there are more than two base stations involved in the handoff. In another embodiment, the adjustment may depend on the number of base stations involved in the handoff (STEP 312). For example, if there are two base stations involved in the handoff, then a $\Delta_2$ adjustment is considered for the estimate $x_k$ (STEP 314) and if there are more than two base stations involved in the handoff, then a $\Delta_3$ adjustment is considered for the estimate $x_k$ (STEP 316). In both of these cases (314 or 316), a predetermined minimum value is used to establish a threshold for the lowest value for the SINR estimate, which means that the adjusted SINR value is configured to be no less than the minimum value. In the exemplary embodiment (shown in FIG. 4A), the minimum value is set at −12 dB. However, other values may be used for the minimum value.

If the DRC is not directed at another sector or base station, then the DRC is directed at this sector, i.e., the same sector that the prior DRC was directed at, in which case, the estimate is not adjusted (STEP 318).

The per-slot estimates $x_k$ are smoothed using a filter (STEP 320). In one embodiment, the filter is an Infinite Impulse Response (IIR) filter. It will be understood by those skilled in the art that any filter that can smooth the estimates $x_k$ can be used. The smoothed estimate is given by: $c_k = c_{k-1} + (x_k - c_{k-1})/N_1$, where $N_1$ is the filter time constant in slots.

For the calculation of required power, the C/I estimate is mapped to a required fractional RPC power allocation $r_k$ using the relationship $r_k = 10^{0.1*(E - c_k - 10*\log_{10} PG)}$, where E is the target RPC bit energy per noise power spectral density $(E_b/N_0)$ in dB, and PG is the RPC subchannel processing gain, i.e., the duration of the RPC bit transmission in chips (STEP 322).

In one embodiment, the smooth filtering is implemented in software. In another embodiment, the smooth filtering is implemented in hardware. In yet another embodiment, the smooth filtering is implemented in a combination of software and hardware. In one embodiment, the smooth filtering is implemented using a lookup table. In another embodiment, the smooth filtering is executed by a software algorithm.

For power allocation, the sum of the powers of all the RLPC Channels must be equal to the pilot channel power. In one embodiment, one of the RLPC Channels is assigned to a Reverse Activity (RA) bit and is allocated a fixed fraction $\alpha_{RA}$ of the total power (STEP 324).

RLPC Channels are checked whether they are active or inactive (STEP 326). For the RLPC indices associated with the active Remote Stations, the required fractional allocation is the calculated required power. For inactive RLPC Channels, $r_k=0$, i.e. no power is allocated to the inactive RLPC Channels (STEP 328).

All RLPC Channels are checked to see which RLPC Channels are active (STEP 330). If the reverse activity channel is the only active RLPC Channel, then all the available power is allocated to it (STEP 332). Otherwise, the available power is divided up among the RLPC Channels as follows:

Let $\alpha_k$ denote the fractional RPC power allocation for the $k^{th}$ RLPC Channel. If $$\sum_{k=1}^{M-1} r_k < 1 - a_{RA}$$

where M is the number of RLPC Channels, then $$a_k = (1 - a_{RA})r_k \Big/ \sum_{k=1}^{M-1} r_k$$

is the final allocation (STEP 334).

If the reverse activity channel is not the only RLPC channel and $$\sum_{k=1}^{M-1} r_k$$

is not less than $1-\alpha_{RA}$, that means the sum of the required powers for the active RPC subchannels is greater than the available power. Then, the following procedure is carried out:

Sort the M-5 RLPC Channels in order of increasing required power, i.e. $r_1 \leq r_2 \leq r_3 \leq \ldots \leq r_{M-1}$. The fractional power allocated to each RLPC Channel is $$a_k = \min\left(r_k, \frac{1}{(M-k)}\left(1 - \sum_{j=0}^{k-1} a_j\right)\right), \quad k = 1, \ldots, M-1.$$

given by

In one embodiment, the baseline parameter values are as shown in Table 1.

TABLE 1

| Parameter | Default Value |
|---|---|
| $\Delta_1$ | 6 dB |
| $\Delta_2$ | 6 dB |
| $\Delta_3$ | 9 dB |
| T | −8 dB |
| $N_1$ | 64 slots |
| E | 0 dB |
| $\alpha_{RA}$ | Variable |

It would be apparent to those skilled in the art that the parameter values may be different than those in Table 1. In addition, the parameter values may be variable. The parameter values should depend upon the particular application and implementation.

Figure 5:
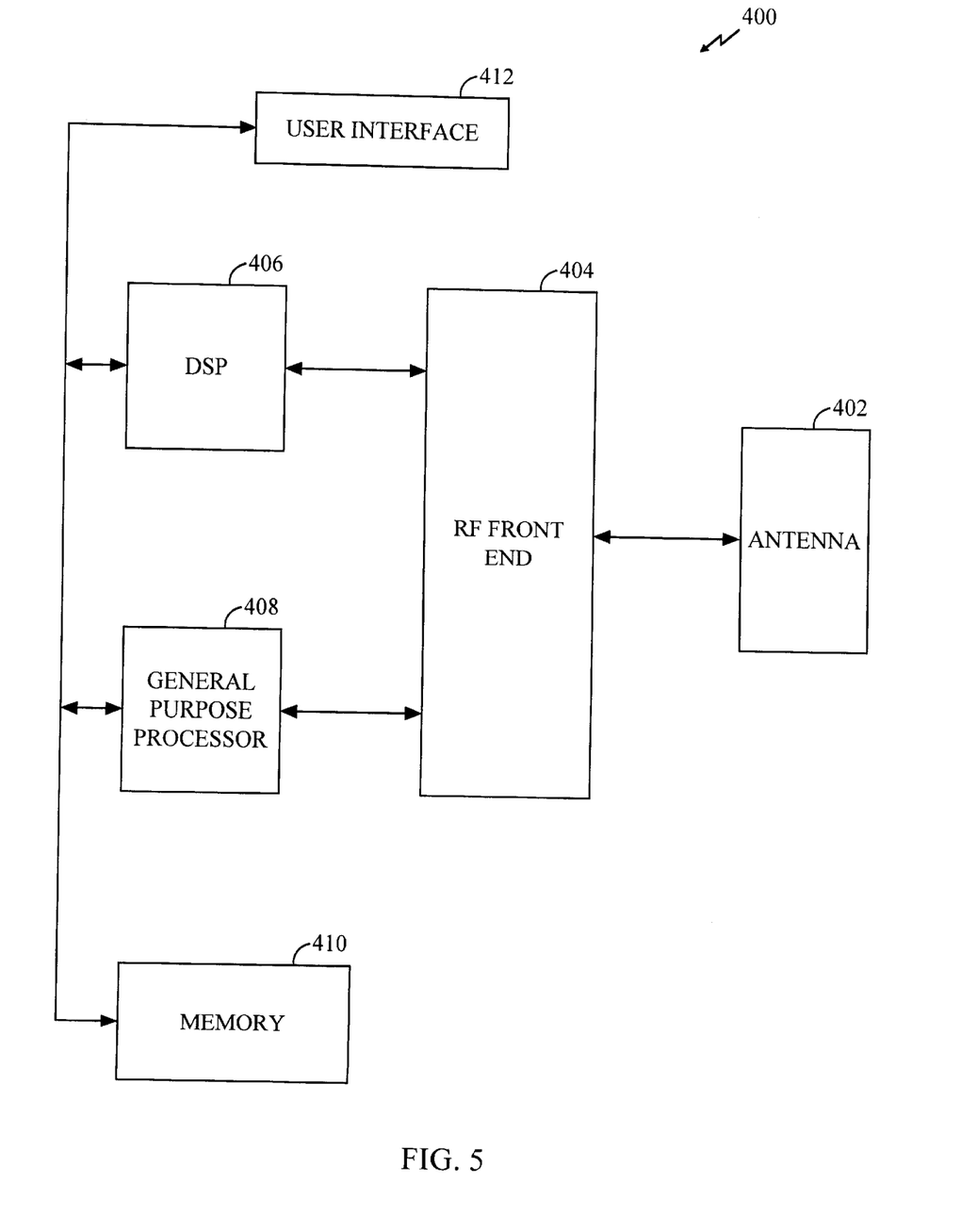
FIG. 5 is a block diagram of a Remote Station in accordance with one embodiment of the disclosed apparatus.

FIG. 5 is a block diagram of a Remote Station 400 in accordance with one embodiment of the disclosed apparatus. The Remote Station 400 includes an antenna 402, a radio frequency (RF) front end 404, a digital signal processor (DSP) 406, a general purpose processor 408, a memory device 410, and a user interface 412.

In accordance with the disclosed method and apparatus, the antenna 402 receives Forward Link signals from one or more Base Stations. The signals are appropriately amplified, filtered and otherwise processed by the RF front end 404. The output from the RF front end 404 is then applied to the DSP 406. The DSP 406 decodes the received Forward Link signals. In addition, DSP 406 provides an indication as to the relative quality of the received Forward Link. The indication of relative quality is stored in the memory 410. The General Purpose Processor 408 is coupled to the DSP 406 and to the memory 410. The General Purpose Processor 408 reads the indications of relative quality from the memory 410 and determines the rate at which each received Forward Link can support data, and determines which Forward Link can support the highest data rate. Once the General Purpose Processor 408 has selected the Forward Link that can support the highest data rate, the General Purpose Processor 408 communicates the selection to the DSP 406. The DSP 406 encodes and modulates the information in a DRC, together with any information from the user interface 412, into a Reverse Link output signal that is provided to the RF front end 404. The RF front end processes the Reverse Link output signal and couples the Reverse Link output signal to the antenna for transmission to each Base Station capable of receiving the signal.

Figure 6:
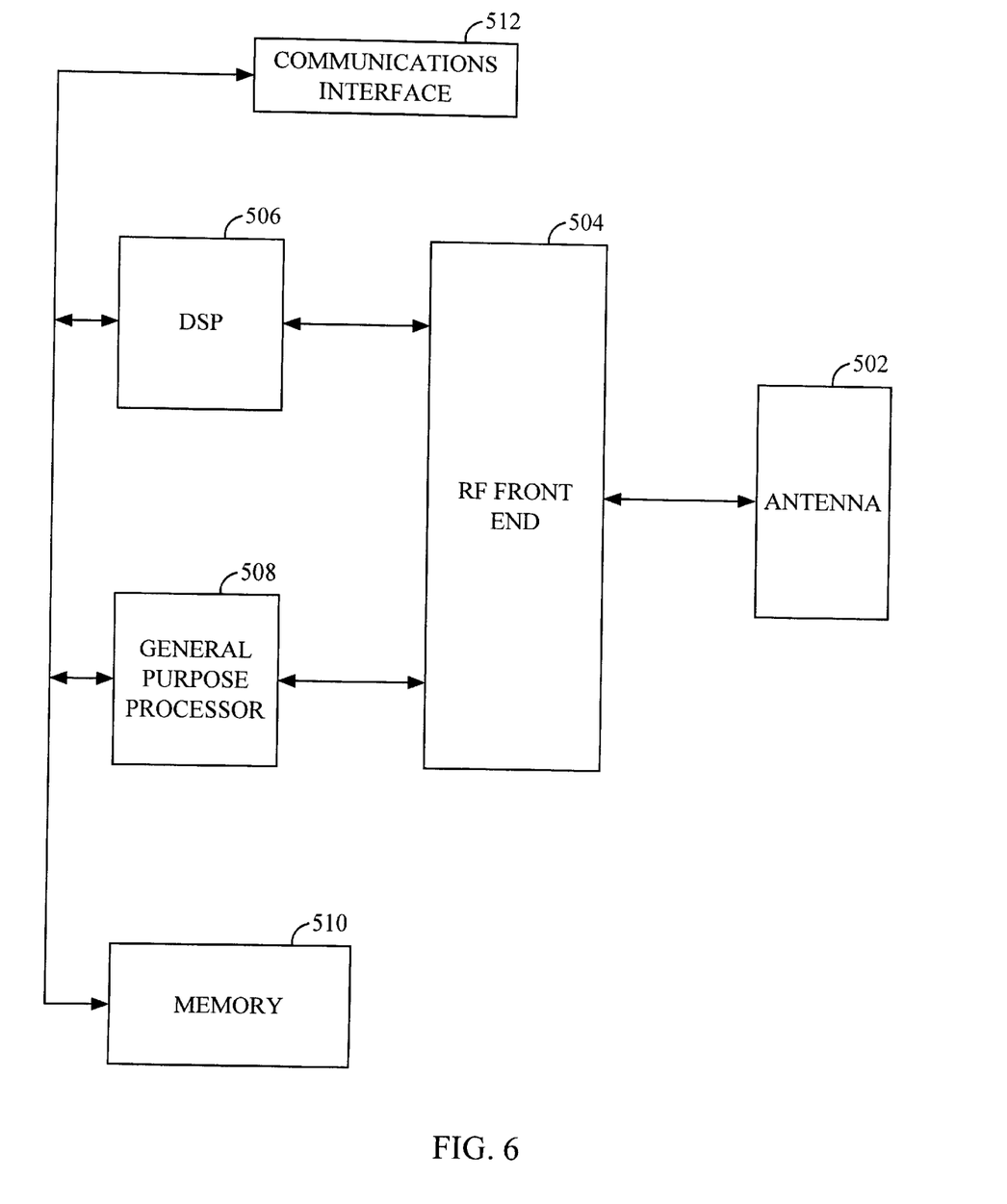
FIG. 6 is a block diagram of a Base Station in accordance with one embodiment of the disclosed apparatus.

FIG. 6 is a block diagram of a Base Station 500 in accordance with one embodiment of the disclosed apparatus. The Base Station 500 includes a transmitter, such as an antenna 502 and a radio frequency (RF) front end 504. The Base Station 500 further includes a digital signal processor (DSP) 506, a general purpose processor 508, a memory device 510, and a communication interface 512.

In accordance with the disclosed apparatus, the antenna 502 receives Reverse Link signals that have been transmitted from nearby Remote Stations 400. The antenna couples these received signals to an RF front end 504 which filters and amplifies the signals. The signals are coupled from the RF front end 504 to the DSP 506 and to the general purpose processor 508 for demodulation, decoding, further filtering, etc. Upon decoding DRCs from the received Reverse Link signals, the DSP 506 stores the decoded DRC in the memory 510. In addition, the DSP 506 determines whether each received Reverse Link was transmitted from the Remote Station with too much or too little power. It should be noted that the Base station 500 typically receives Reverse Link signals from more than one Remote Station 400 at a time.

The general purpose processor 508 then performs the process shown in FIGS. 4a–4b. The general purpose processor 508 communicates to the DSP 506 the amount of power that should be allocated to each RLPC Channel. Based upon the allocation of power to each RLPC Channel, the DSP 506 modulates and encodes the Forward Link signals to be transmitted by the Base Station 500. The signal is coupled to the RF front end 504. The RF front end couples the signal to the antenna 502, which transmits the Forward Link signal to the Remote Stations.

The disclosed method and apparatus is provided to enable any person skilled in the art to make or use the present invention. The various modifications to the disclosed method and apparatus will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method, comprising:

receiving data rate control information from a plurality of stations in a communications system, the data rate control information indicating the data rate at which power control information is to be transmitted by a first station to the plurality of stations;

adjusting the data rate control information from each station of the plurality of stations based upon a destination sector of the data rate control information; and determining from the adjusted data rate control information the amount of power required to transmit the power control information from the first station to the plurality of stations.

2. A base station within a communication system, including:

a receiver configured to receive data rate control information from a plurality of stations, the data rate control information indicating the data rate at which power control information is to be transmitted by the base station to the plurality of stations;

a processor, coupled to the receiver, configured to adjust the data rate control information from each station of the plurality of stations based upon a destination sector of the data rate control information, wherein the processor uses the adjusted data rate control information to determine the amount of power required to transmit the power control information from the base station to the plurality of stations.

3. The method of claim 1, wherein the first station includes a base station.

4. The method of claim 1, wherein the plurality of stations includes a plurality of remote stations.

5. The method of claim 1, wherein determining is performed by a base station.

6. The method of claim 1, wherein determining is performed by a base station controller.

7. The method of claim 1, further comprising:

determining whether the first station can decode messages in the data rate control information.

8. The method of claim 7, further comprising:

setting the amount of power required to transmit the power control information to the plurality of stations at a first constant value if the first station cannot decode messages in the data rate control information.

9. The method of claim 1, further comprising:

calculating a signal-to-interference-plus-noise ratio (SINR) from the received data rate control information.

10. The method of claim 9, wherein the calculating a SINR includes obtaining a SINR value corresponding to the received data rate control information in a table.

11. The method of claim 9, further comprising:

increasing the SINR value by a second constant value if the received data rate control information is directed at another destination sector of the first station.

12. The method of claim 9, further comprising:

providing a plurality of base stations, wherein the first station is a first base station of the plurality of base stations.

13. The method of claim 12, further comprising:

decreasing the SINR value by a third constant value if the received data rate control information is directed at another base station other than the first base station.

14. The method of claim 13, wherein decreasing the SINR value includes providing a minimum threshold value for the SINR value.

15. The method of claim 9, further comprising:

smoothing the calculated SINR value using a filter.

16. The method of claim 15, further comprising:

mapping the smoothed SINR value to a required fractional reverse power control (RPC) power allocation $r_k$ using the relationship $r_k = 10^{0.1*(E-c_k-10*log_{10}PG)}$, where E is the target RPC bit energy per noise power spectral density ($E_b/N_0$) in dB, $c_k$ is the smoothed SINR value, and PG is the RPC subchannel processing gain.

17. The method of claim 1, wherein the determining includes:

providing a plurality of reverse link power control (RLPC) channels; and assigning a reverse activity (RA) bit to one of the plurality of RLPC channels.

18. The method of claim 17, further comprising:

allocating a fixed fraction of total power to the RA bit.

19. The method of claim 18, further comprising:

determining activity status of the RLPC channels.

20. The method of claim 19, further comprising:

allocating a remainder of the total power, after allocating the fixed fraction to the RA bit, to the RLPC channels that are active.

21. The base station of claim 2, wherein the signal processor includes:

a calculator configured to calculate a signal-to-interference-plus-noise ratio (SINR) value from the received data rate control information.

22. The base station of claim 21, further comprising:

a memory configured to store data comprising a table of values that establishes a correspondence between the data rate control information and the SINR value for each station of the plurality of stations.

23. A wireless communication system, comprising:

a plurality of remote station devices configured to determine and transmit data rate control information; and a base station apparatus configured to receive the data rate control information from the plurality of remote station devices, the data rate control information indicating the data rate at which power control information is to be transmitted by a first station to the plurality of stations, the base station apparatus operating to adjust the data rate control information from each device of the plurality of remote station devices based upon a destination sector of the data rate control information, wherein the base station apparatus uses the adjusted data rate control information to determine the amount of power required to transmit the power control information from the base station apparatus to the plurality of remote station devices.

24. The system of claim 23, wherein each device of the plurality of remote station devices includes a digital signal processor (DSP) configured to encode and modulate information in the data rate control information.

* * * * *

UNITED STATES PATENT AND TRADEMARK OFFICE
CERTIFICATE OF CORRECTION

PATENT NO.     : 6,678,257 B1                                    Page 1 of 1
DATED          : January 13, 2004
INVENTOR(S)    : Vijayan et al.

It is certified that error appears in the above-identified patent and that said Letters Patent is hereby corrected as shown below:

<u>Drawings,</u>
Sheet 3, Fig. 3, please delete reference numbers numerals "221";

Signed and Sealed this

Fifteenth Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,678,257 B1
DATED : January 13, 2004
INVENTOR(S) : Vijayan et al.

Page 1 of 1

It is certified that error appears in the above-identified patent and that said Letters Patent is hereby corrected as shown below:

Drawings,
Sheet 3, FIG. 3, reference numerals "221" (as deleted by Certificate of Correction issued March 15, 2005) is to be reinstated.

Column 4,
Line 47, delete "213" and replace with -- 208 --;

Column 11,
Line 48, delete "DRC" and replace with -- RPC --;

Column 12,
Lines 30 and 31, delete "SINR" and replace with -- C/I --;

Column 15,
Lines 39 and 57, delete "SINR" and replace with -- C/I --;
Lines 42 and 47, delete "decode" and replace with -- demodulate --;
Lines 51 and 52, delete "signal to interference-plus-noise ratio (SINR)" and replace with -- carrier/interference (C/I) --;
Line 54, delete both "SINR" and replace with -- C/I --;

Column 16,
Lines 2, 5, 7, 9, 11 and 15, delete "SINR" and replace with -- C/I --;
Lines 33 and 34, delete "signal to interference-plus-noise ratio (SINR)" and replace with -- carrier/interference (C/I) --.

Signed and Sealed this

Twentieth Day of December, 2005

JON W. DUDAS
*Director of the United States Patent and Trademark Office*